US012804621B2

(12) United States Patent
Si et al.

(10) Patent No.: US 12,804,621 B2
(45) Date of Patent: Nov. 17, 2026

(54) UPLINK MULTIPLEXING TRANSMISSION METHOD, APPARATUS AND STORAGE MEDIUM

(71) Applicant: DATANG MOBILE COMMUNICATIONS EQUIPMENT CO., LTD., Beijing (CN)

(72) Inventors: Qianqian Si, Beijing (CN); Xuejuan Gao, Beijing (CN)

(73) Assignee: DATANG MOBILE COMMUNICATION EQUIPMENT CO., LTD., Beijing (CN)

( * ) Notice: Subject to any disclaimer, the term of this patent is extended or adjusted under 35 U.S.C. 154(b) by 429 days.

(21) Appl. No.: 18/552,673

(22) PCT Filed: Mar. 18, 2022

(86) PCT No.: PCT/CN2022/081822

§ 371 (c)(1),
(2) Date: Sep. 27, 2023

(87) PCT Pub. No.: WO2022/206443

PCT Pub. Date: Oct. 6, 2022

(65) Prior Publication Data

US 2024/0155576 A1 May 9, 2024

(30) Foreign Application Priority Data

Apr. 2, 2021 (CN) ......................... 202110363231.9

(51) Int. Cl.

*H04W 72/0446* (2023.01)
*H04L 1/1812* (2023.01)

(Continued)

(52) U.S. Cl.

CPC ....... *H04W 72/0446* (2013.01); *H04L 1/1812* (2013.01); *H04W 72/21* (2023.01); *H04W 72/56* (2023.01)

(58) Field of Classification Search

CPC . H04W 72/0446; H04W 72/21; H04W 72/56; H04W 72/1268; H04W 72/569;

(Continued)

(56) References Cited

U.S. PATENT DOCUMENTS

2019/0261361 A1 8/2019 Xiong et al.
2020/0053761 A1 2/2020 Hosseini et al.

(Continued)

FOREIGN PATENT DOCUMENTS

CN 110536464 A 12/2019
CN 111278143 A 6/2020

(Continued)

OTHER PUBLICATIONS

European Patent Office, Extended European Search Report Issued in Application No. 22778626.6, Sep. 3, 2024, Germany, 12 pages.

(Continued)

*Primary Examiner* — Sharmin Chowdhury
(74) *Attorney, Agent, or Firm* — KILPATRICK TOWNSEND & STOCKTON LLP

(57) ABSTRACT

The present disclosure provides an uplink multiplexing transmission method, an apparatus and a storage medium, which are applied to a terminal or a base station. A time unit of a multiplexing process is determined in a case that at least two uplink channels with different physical layer priorities or different types overlap in a time domain; for a target uplink channel spanning a plurality of time units in the at least two uplink channels, if a preset multiplexing end condition is not met, the multiplexing process is performed sequentially in each time unit overlapping in the time (Continued)

domain with the target uplink channel until the preset multiplexing end condition is met, to obtain a final processing result of the multiplexing process; and uplink channel transmission is performed based on the processing result of the multiplexing process.

18 Claims, 6 Drawing Sheets

(51) Int. Cl.
*H04W 72/21* (2023.01)
*H04W 72/56* (2023.01)

(58) Field of Classification Search
CPC ... H04W 72/04; H04W 72/12; H04W 72/563; H04L 1/1812; H04L 1/1671; H04L 1/1854; H04L 5/0053; H04L 5/0055; H04L 5/0057; H04L 5/0078
See application file for complete search history.

(56) References Cited

U.S. PATENT DOCUMENTS

| | | | | |
|---|---|---|---|---|
| 2020/0296716 | A1 | 9/2020 | Lin et al. | |
| 2020/0322972 | A1 | 10/2020 | Hosseini et al. | |
| 2021/0105766 | A1* | 4/2021 | Wang | H04W 72/21 |
| 2022/0232610 | A1* | 7/2022 | Lee | H04L 1/1812 |
| 2022/0287010 | A1* | 9/2022 | Chen | H04L 1/1812 |
| 2022/0394707 | A1* | 12/2022 | Chen | H04W 72/21 |
| 2022/0417967 | A1* | 12/2022 | Lin | H04W 72/1268 |
| 2023/0379962 | A1* | 11/2023 | Andersson | H04W 72/21 |
| 2024/0155667 | A1* | 5/2024 | Jung | H04W 72/21 |

FOREIGN PATENT DOCUMENTS

| | | | |
|---|---|---|---|
| CN | 111670600 | A | 9/2020 |
| CN | 111817830 | A | 10/2020 |
| WO | 2019205137 | A1 | 10/2019 |
| WO | 2020187167 | A1 | 9/2020 |
| WO | 2020198645 | A1 | 10/2020 |
| WO | 2021012996 | A1 | 1/2021 |

OTHER PUBLICATIONS

Ericsson, “Intra-UE Multiplexing/Prioritization Enhancements for IIoT/URLLC”, 3GPP TSG-RAN WG1 Meeting #103-e, Online, Oct. 26-Nov. 13, 2020, total 12 pages, R1-2007710.

OPPO, “Enhancements on intra-UE multiplexing/prioritization”, 3GPP TSG RAN WG1#103-e, e-Meeting, Oct. 26-Nov. 13, 2020, total 6 pages, R1-2008282.

Samsung, “Uplink intra-UE multiplexing and prioritization”, 3GPP TSG RAN WG1 #104-e, e-Meeting, Jan. 25-Feb. 5, 2021, total 9 pages, R1-2101204.

ISA State Intellectual Property Office of the People’s Republic of China, International Search Report and Written Opinion Issued in Application No. PCT/CN2022/081822, Jun. 9, 2022, WIPO, 13 pages.

The first office action and search report issued in Chinese corresponding application 202110363231.9, mailed on Jan. 18, 2025.

The Notice of Allowance and Search Report issued in Chinese corresponding application 202110363231.9, mailed on Apr. 15, 2026.

* cited by examiner

UPLINK MULTIPLEXING TRANSMISSION METHOD, APPARATUS AND STORAGE MEDIUM

CROSS-REFERENCE TO RELATED APPLICATIONS

This disclosure is a National Stage of International Application No. PCT/CN2022/081822, filed on Mar. 18, 2022, which claims priority to Chinese Patent Application No. 202110363231.9, filed to the China National Intellectual Property Administration on Apr. 2, 2021 and entitled "UPLINK MULTIPLEXING TRANSMISSION METHOD, APPARATUS AND STORAGE MEDIUM". Both of the above applications are hereby incorporated by reference in their entireties.

FIELD

The present disclosure relates to the field of communication technologies, and in particular to an uplink multiplexing transmission method, an apparatus and a storage medium.

BACKGROUND

In a fifth generation new radio system (5. Generation New Radio, 5G NR), there may be an overlap between time domain resources of multiple uplink channels for a same one terminal. For example, there is a time domain resource overlap between a PUCCH (Physical Uplink Control Channel) and a PUCCH, or there is a time domain resource overlap between a PUCCH and a PUSCH (Physical Uplink Shared Channel).

In version Rel-16 of the 5G standard, a definition of two-level physical layer priorities is introduced for an uplink channel, that is, an uplink supports two kinds of physical channels with different physical layer priorities. When a physical channel with a high priority and a physical channel with a low priority overlap in a time domain, the terminal drops the physical channel with the low priority and transmits only the physical channel with the high priority, which affects a transmission of uplink control information.

SUMMARY

The present disclosure provides an uplink multiplexing transmission method, an apparatus and a storage medium, so as to reduce influence caused by dropping an uplink channel in a case that uplink channels overlap in a time domain.

In a first aspect, the present disclosure provides an uplink multiplexing transmission method, applied to a terminal or a base station, where the method includes:

- determining a time unit of a multiplexing processing in a case that at least two uplink channels with different physical layer priorities or different types overlap in a time domain;
- for a target uplink channel spanning a plurality of time units in the at least two uplink channels, if a preset multiplexing end condition is not met, sequentially performing the multiplexing process in each time unit overlapping in the time domain with the target uplink channel until the preset multiplexing end condition is met, to obtain a final processing result of the multiplexing process;
- performing uplink channel transmission based on the processing result of the multiplexing process.

In a possible design, sequentially performing the multiplexing process in each time unit overlapping in the time domain with the target uplink channel until the preset multiplexing end condition is met includes:

- for a low-priority PUCCH spanning a plurality of time units, performing the multiplexing process in a first time unit overlapping in the time domain with the low-priority PUCCH;
- if it is determined in a current multiplexing process that the low-priority PUCCH is dropped or successfully multiplexed with a further uplink channel, stopping a subsequent multiplexing process of the low-priority PUCCH in a further time unit overlapping in the time domain with the low-priority PUCCH;
- otherwise, continuing the multiplexing process of the low-priority PUCCH in a next time unit overlapping in the time domain with the low-priority PUCCH;
- repeating above process until the low-priority PUCCH is dropped or successfully multiplexed with a further uplink channel.

In a possible design, sequentially performing the multiplexing process in each time unit overlapping in the time domain with the target uplink channel includes:

- determining all PUCCHs in a time unit of a current multiplexing process as a Q set, and executing the multiplexing process according to a multiplexing rule in a case of time domain overlapping, to obtain a PUCCH with no time domain overlap in the time unit of the current multiplexing process.

In a possible design, in a process of sequentially performing the multiplexing process in each time unit overlapping in the time domain with the target uplink channel, the method further includes:

- if a preset condition is met, performing a dropping operation on at least one uplink channel in the Q set, where the preset condition includes:
- in the time unit of the current multiplexing process, the uplink channel obtained through the multiplexing process still spans a plurality of time units; or
- in the time unit of the current multiplexing process, the uplink channel obtained through the multiplexing process is located in a further time unit; or
- in the time unit of the current multiplexing process, a starting position of the uplink channel obtained through the multiplexing process is earlier than a starting position of the time unit of the current multiplexing process.

In a possible design, performing the dropping operation on the at least one uplink channel in the Q set includes:

- if physical layer priorities of uplink channels in the Q set are different, dropping a low-priority uplink channel; or
- if physical layer priorities of uplink channels in the Q set are identical, dropping an uplink channel carrying a low-priority UCI type based on preset priorities of UCI types carried by the uplink channels.

In a possible design, an order of the preset priorities of the UCI types is: hybrid automatic repeat request acknowledgement HARQ-ACK>scheduling request SR>channel state information CSI.

In a possible design, the method further includes:

- if there is no uplink channel overlapping in the time domain with the target uplink channel in the time unit of the current multiplexing process, continuing the multiplexing process in a next time unit overlapping in the time domain with the target uplink channel.

In a possible design, the at least two uplink channels are at least two uplink channels with different physical layer priorities;

determining the time unit of the multiplexing process includes:

determining the time unit of the multiplexing process according to transmission time units of HARQ-ACKs with different physical layer priorities.

In a possible design, determining the time unit of the multiplexing process according to the transmission time units of the HARQ-ACKs with different physical layer priorities includes:

determining a transmission time unit of a HARQ-ACK with a high priority among the different physical layer priorities as the time unit of the multiplexing process.

In a possible design, the at least two uplink channels are at least two uplink channels with different types;

determining the time unit of the multiplexing process includes:

determining a transmission time unit of an uplink channel with a shorter transmission time unit among the at least two uplink channels as the time unit of the multiplexing process; or determining a transmission time unit of an uplink channel with a target type among the at least two uplink channels as the time unit of the multiplexing process.

In a possible design, the at least two uplink channels include an MBS PUCCH and a unicast PUCCH.

In a possible design, the method further includes:

in a case that a PUCCH in the processing result of the multiplexing process and a physical uplink shared channel PUSCH overlap in the time domain, if it is determined that the terminal supports parallel transmission of the PUCCH and the PUSCH, transmitting the PUCCH and the PUSCH simultaneously;

if it is determined that the terminal does not support the parallel transmission of the PUCCH and the PUSCH, performing multiplexing transmission on the PUCCH and the PUSCH, or dropping one of the uplink channels.

In a second aspect, the present disclosure provides an uplink multiplexing transmission apparatus, including a memory, a transceiver and a processor.

The memory is configured to store a computer program; the transceiver is configured to transmit and receive data under control of the processor; the processor is configured to read the computer program in the memory and perform the following operations:

determining a time unit of a multiplexing process in a case that at least two uplink channels with different physical layer priorities or different types overlap in a time domain;

for a target uplink channel spanning a plurality of time units in the at least two uplink channels, if a preset multiplexing end condition is not met, sequentially performing the multiplexing process in each time unit overlapping in the time domain with the target uplink channel until the preset multiplexing end condition is met, to obtain a final processing result of the multiplexing process;

performing uplink channel transmission based on the processing result of the multiplexing process.

In a possible design, when sequentially performing the multiplexing process in each time unit overlapping in the time domain with the target uplink channel until the preset multiplexing end condition is met, the processor is configured to:

for a low-priority PUCCH spanning a plurality of time units, perform the multiplexing process in a first time unit overlapping in the time domain with the low-priority PUCCH;

if it is determined in a current multiplexing process that the low-priority PUCCH is dropped or successfully multiplexed with a further uplink channel, stop a subsequent multiplexing process of the low-priority PUCCH in a further time unit overlapping in the time domain with the low-priority PUCCH;

otherwise, continue the multiplexing process of the low-priority PUCCH in a next time unit overlapping in the time domain with the low-priority PUCCH;

repeat above process until the low-priority PUCCH is dropped or successfully multiplexed with a further uplink channel.

In a possible design, when sequentially performing the multiplexing process in each time unit overlapping in the time domain with the target uplink channel, the processor is configured to:

determine all PUCCHs in a time unit of a current multiplexing process as a Q set, and execute the multiplexing process according to a multiplexing rule in a case of time domain overlapping, to obtain a PUCCH with no time domain overlap in the time unit of the current multiplexing process.

In a possible design, in a process of sequentially performing the multiplexing process in each time unit overlapping in the time domain with the target uplink channel, the processor is further configured to:

if a preset condition is met, perform a dropping operation on at least one uplink channel in the Q set, where the preset condition includes:

in the time unit of the current multiplexing process, the uplink channel obtained through the multiplexing process still spans a plurality of time units; or in the time unit of the current multiplexing process, the uplink channel obtained through the multiplexing process is located in a further time unit; or in the time unit of the current multiplexing process, a starting position of the uplink channel obtained through the multiplexing process is earlier than a starting position of the time unit of the current multiplexing process.

In a possible design, when performing the dropping operation on the at least one uplink channel in the Q set, the processor is configured to:

if physical layer priorities of uplink channels in the Q set are different, drop a low-priority uplink channel; or if physical layer priorities of uplink channels in the Q set are identical, drop an uplink channel carrying a low-priority UCI type based on preset priorities of UCI types carried by the uplink channels.

In a possible design, an order of the preset priorities of the UCI types is: hybrid automatic repeat request acknowledgement HARQ-ACK>scheduling request SR>channel state information CSI.

In a possible design, the processor is further configured to:

if there is no uplink channel overlapping in the time domain with the target uplink channel in the time unit of the current multiplexing process, continue the multiplexing process in a next time unit overlapping in the time domain with the target uplink channel.

In a possible design, the at least two uplink channels are at least two uplink channels with different physical layer priorities;

when determining the time unit of the multiplexing process, the processor is configured to:

determine the time unit of the multiplexing process according to transmission time units of HARQ-ACKs with different physical layer priorities.

In a possible design, when determining the time unit of the multiplexing process according to the transmission time units of the HARQ-ACKs with different physical layer priorities, the processor is configured to:

determine a transmission time unit of a HARQ-ACK with a high priority among the different physical layer priorities as the time unit of the multiplexing process.

In a possible design, the at least two uplink channels are at least two uplink channels with different types;

when determining the time unit of the multiplexing process, the processor is configured to:

determine a transmission time unit of an uplink channel with a shorter transmission time unit among the at least two uplink channels as the time unit of the multiplexing process; or determine a transmission time unit of an uplink channel with a target type among the at least two uplink channels as the time unit of the multiplexing process.

In a possible design, the at least two uplink channels with different types include an MBS PUCCH and a unicast PUCCH.

In a possible design, the processor is further configured to:

in a case that a PUCCH in the processing result of the multiplexing process and a physical uplink shared channel PUSCH overlap in the time domain, if it is determined that the terminal supports parallel transmission of the PUCCH and the PUSCH, transmit the PUCCH and the PUSCH simultaneously;

if it is determined that the terminal does not support the parallel transmission of the PUCCH and the PUSCH, perform multiplexing transmission on the PUCCH and the PUSCH, or drop one of the uplink channels.

In a possible design, the uplink multiplexing transmission apparatus is a terminal or a base station.

In a third aspect, the present disclosure provides an uplink multiplexing transmission apparatus, applied to a terminal or a base station, where the apparatus includes:

a determining unit, configured to determine a time unit of a multiplexing process in a case that at least two uplink channels with different physical layer priorities or different types overlap in a time domain;

a multiplexing unit, configured to, for a target uplink channel spanning a plurality of time units in the at least two uplink channels, if a preset multiplexing end condition is not met, sequentially perform the multiplexing process in each time unit overlapping in the time domain with the target uplink channel until the preset multiplexing end condition is met, to obtain a final processing result of the multiplexing process;

a transmission unit, configured to perform uplink channel transmission based on the processing result of the multiplexing process.

In a fourth aspect, the present disclosure provides a processor-readable storage medium, where the processor-readable storage medium stores a computer program, and the computer program is used to cause a processor to execute the method according to the first aspect.

In a fifth aspect, the present disclosure provides a computer program product including a computer program, and the computer program is used to cause a processor to execute the method according to the first aspect.

The present disclosure provides an uplink multiplexing transmission method, an apparatus and a storage medium which are applied to a terminal or a base station. A time unit of a multiplexing process is determined in a case that at least two uplink channels with different physical layer priorities or different types overlap in a time domain; for a target uplink channel spanning a plurality of time units in the at least two uplink channels, if a preset multiplexing end condition is not met, the multiplexing process is performed sequentially in each time unit overlapping in the time domain with the target uplink channel until the preset multiplexing end condition is met, to obtain a final processing result of the multiplexing process; and uplink channel transmission is performed based on the processing result of the multiplexing process. In embodiments of the present disclosure, in the case that the uplink channels overlap in the time domain, by sequentially performing the multiplexing process in the time unit of each multiplexing process until the preset multiplexing end condition is met, uplink control information carried by an uplink channel with a time domain overlap can be multiplexed to a further channel, so that uplink multiplexing transmission can be effectively performed, and influence caused by dropping an uplink channel can be reduced.

It should be understood that what is described in the above Summary section is not intended to limit key or important features of the embodiments of the present disclosure, nor is it intended to limit the scope of the present disclosure. Other features of the present disclosure will be readily understood by the following description.

BRIEF DESCRIPTION OF DRAWINGS

In order to explain the embodiments in the present disclosure or in the prior art more clearly, the drawings that need to be used in the description of the embodiments or the prior art will be briefly introduced in the following. The drawings in the following description are some embodiments of the present disclosure.

DESCRIPTION OF EMBODIMENTS

Figure 1A:
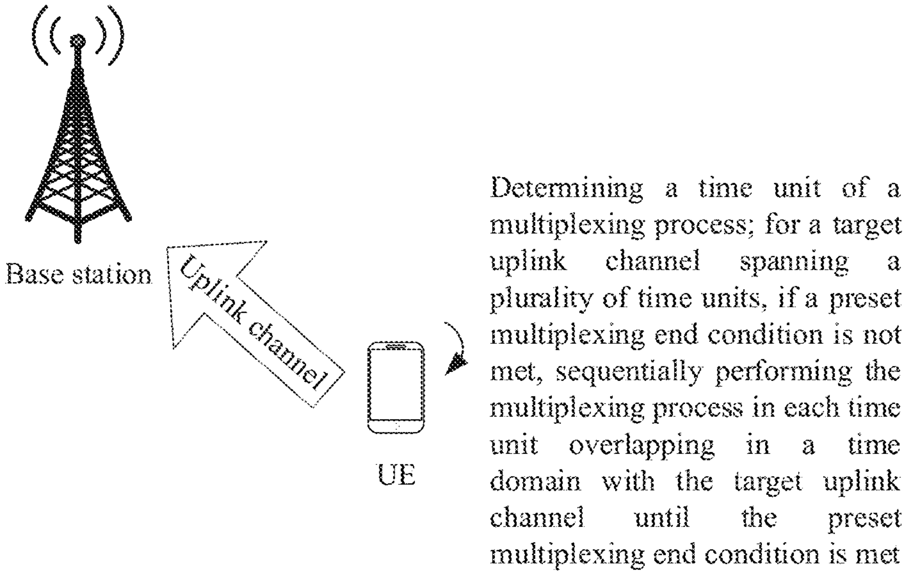
FIG. 1*a* is a schematic diagram of an application scenario of an uplink multiplexing transmission method provided by an embodiment of the present disclosure.

In the present disclosure, the term "and/or" describes an association relationship of associated objects, indicating that there may be three kinds of relationships. For example, A and/or B can indicate three cases, i.e., A exists alone, A and B exist at the same time, and B exists alone. The character "/" generally indicates that associated objects before and after the character is of an "OR" relationship. In embodiments of the present disclosure, the term "plurality" refers to two or more, and other quantifiers are similar.

In the fifth generation new radio (5 Generation New Radio, 5G NR), there may be an overlap between time domain resources of multiple uplink channels for a same one terminal. For example, there is a time domain resource overlap between a PUCCH (Physical Uplink Control Channel) and a PUCCH, or there is a time domain resource overlap between a PUCCH and a PUSCH (Physical Uplink Shared Channel).

In the version Rel-15 of the 5G standard, for a same one terminal, in order to avoid an excessive a PAPR (Peak to Average Power Ratio), simultaneous transmission of multiple PUCCHs is not supported, and simultaneous transmission of a PUCCH and a PUSCH is not supported. Therefore, when time domain resources of a PUCCH and a PUCCH overlap, the terminal can multiplex UCI on the same one PUCCH for transmission; and when time domain resources of a PUCCH and a PUSCH overlap, the terminal can multiplex UCI on the PUSCH for transmission, thereby being unnecessary to transmit the PUCCH.

When there are overlaps for time domain resources of a plurality of PUCCHs and a PUSCH, the terminal firstly handles, in units of time slots, a conflict between uplink control channels PUCCHs within one time slot. The terminal takes all PUCCHs within one time slot as a Q set, and multiplexes them in a prescribed manner to obtain one or more non-overlapping PUCCHs. Then a conflict between a PUCCH and a PUSCH is handled, and UCI carried by the PUCCH is multiplexed on the PUSCH for transmission in a prescribed manner.

The above time domain resource overlap or conflict refers to a conflict in a same carrier group. For example, an MCG and an SCG in a dual-link are each a carrier group, and for example, when transmission of a PUCCH on an SCG is supported, there will be a Primary PUCCH Group and a Secondary PUCCH Group, with each PUCCH group being one carrier group.

In the version Rel-16 of the 5G standard, a definition of two-level physical layer priorities is introduced for an uplink channel, that is, an uplink supports two kinds of physical channels with different physical layer priorities. When a physical channel with a high priority and a physical channel with a low priority overlap in a time domain, the terminal drops the physical channel with the low priority and transmits only the physical channel with the high priority.

For HARQ-ACK (Hybrid Automatic Repeat request—ACKnowledgment) transmission, a Sub-slot transmission scheme is also introduced, where a PUCCH resource for a HARQ-ACK is defined within a range of Sub-slot. A time slot is divided into a plurality of Sub-slots, and configurations of HARQ-ACKs with different priorities may be different. For example, a HARQ-ACK with a high priority uses transmission based on a Sub-slot, a HARQ-ACK with a low priority uses transmission based on a Slot; or a HARQ-ACK with a high priority and a HARQ-ACK with a low priority use transmission based on Sub-slots with different lengths.

When time domain resources of uplink channels with the same physical layer priority overlap, the terminal determines a time unit for multiplexing based on corresponding configuration information, and performs, in a unit of the time unit, multiplexing transmission of the uplink channels with the same physical layer priority within a range of the time unit in a manner of Rel-15.

When there are conflicts for uplink channels with the same physical layer priority and uplink channels with different physical layer priorities at the same time, the terminal first handles multiplexing between low-priority uplink channels, then handles a time domain resource overlap between different priorities, and then handles multiplexing between high-priority uplink channels, and finally handles a time domain resource overlap between a multiplexed high-priority uplink channel and a multiplexed low-priority uplink channel, that is, the terminal drops the low-priority physical channel and transmits only the high-priority physical channel.

In order to reduce influence of dropping a lower-priority uplink channel in a case of uplink channels with different physical layer priorities overlapping in the time domain, a multiplexing transmission method for uplink channels with different priorities is currently being investigated. However, since transmission time units of uplink channel HARQ-ACKs with different priorities may be different, there is no clear multiplexing transmission method when uplink channels with different transmission time units conflict.

An embodiment of the present disclosure provides an uplink multiplexing transmission method. For a terminal or a base station, in a case that at least two uplink channels with different physical layer priorities or different types overlap in a time domain, a time unit of a multiplexing process is firstly determined, for example, the time unit of the multiplexing process is determined based on a transmission time unit of a high-priority HARQ-ACK. For a target uplink channel spanning a plurality of time units, if a preset multiplexing end condition is not met, the multiplexing process is sequentially performed in each time unit overlapping in the time domain with the target uplink channel until the preset multiplexing end condition is met, and a final processing result of the multiplexing process is obtained. For example, for a low-priority PUCCH, in a case of not being dropped and not being multiplexed with a further uplink channel, the low-priority PUCCH participates in the multiplexing process in each multiplexing process time unit overlapping in the time domain with this low-priority PUCCH, and finally, uplink channel transmission is performed based on the processing result of the multiplexing process. In this way, influence of dropping certain uplink channels when the uplink channels overlap in the time domain, such as influence on transmission of uplink control information, can be reduced.

Figure 1B:
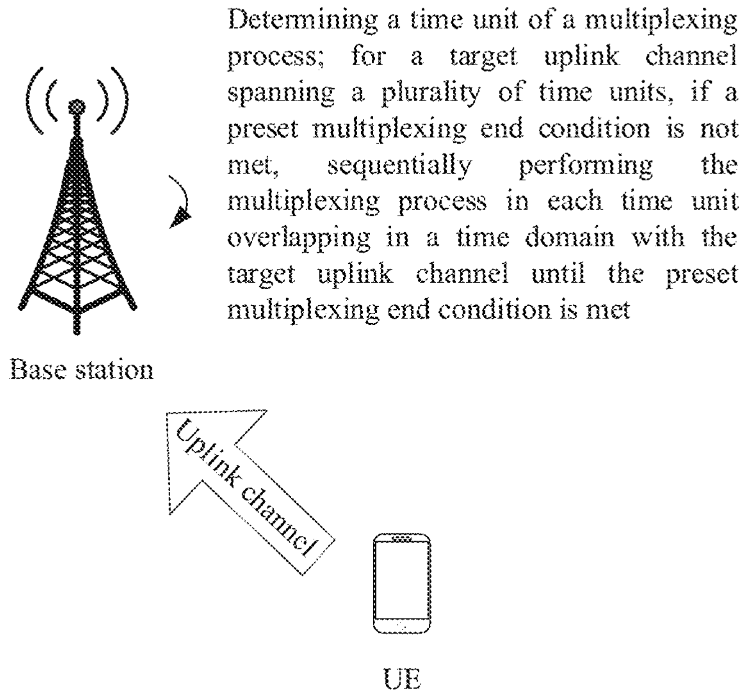
FIG. 1*b* is a schematic diagram of an application scenario of an uplink multiplexing transmission method provided by another embodiment of the present disclosure.

The multiplexing transmission method provided by the embodiment of the present disclosure can be applied to an application scenario as shown in FIG. 1*a* or an application scenario as shown in FIG. 1*b*. These application scenarios include a base station and a terminal (Terminal/User Equipment, UE).

In FIG. 1*a*, the terminal UE determines a time unit of a multiplexing process in a case that at least two uplink channels with different physical layer priorities or different types overlap in a time domain. For a target uplink channel spanning a plurality of time units in the at least two uplink channels, if a preset multiplexing end condition is not met, the terminal UE sequentially performs the multiplexing process in each time unit overlapping in the time domain with the target uplink channel until the preset multiplexing end condition is met, to obtain a final processing result of the multiplexing process. The terminal UE performs uplink channel transmission with the base station based on the processing result of the multiplexing process.

In FIG. 1*b*, the base station determines a time unit of a multiplexing process in a case that at least two uplink channels with different physical layer priorities or different types overlap in a time domain. For a target uplink channel spanning a plurality of time units in the at least two uplink channels, if a preset multiplexing end condition is not met, the base station sequentially performs the multiplexing process in each time unit overlapping in the time domain with the target uplink channel until the preset multiplexing end condition is met, to obtain a final processing result of the multiplexing process. The base station receives, based on the processing result of the multiplexing process, uplink information transmitted by the terminal UE through an uplink channel.

The embodiments of the present disclosure will be described clearly and comprehensively with reference to the drawings in the embodiments of the present disclosure. The described embodiments are only part of the embodiments of the present disclosure, rather than all of them. Based on the embodiments in the present disclosure, all other embodiments belong to the protection scope of the present disclosure.

Methods and the apparatuses are based on the same application concept. Since the methods and the apparatuses solve the problem on similar principles, the implementation of the apparatuses and the methods can be referred to for each other, and the repetition will not be repeated herein.

Figure 2:
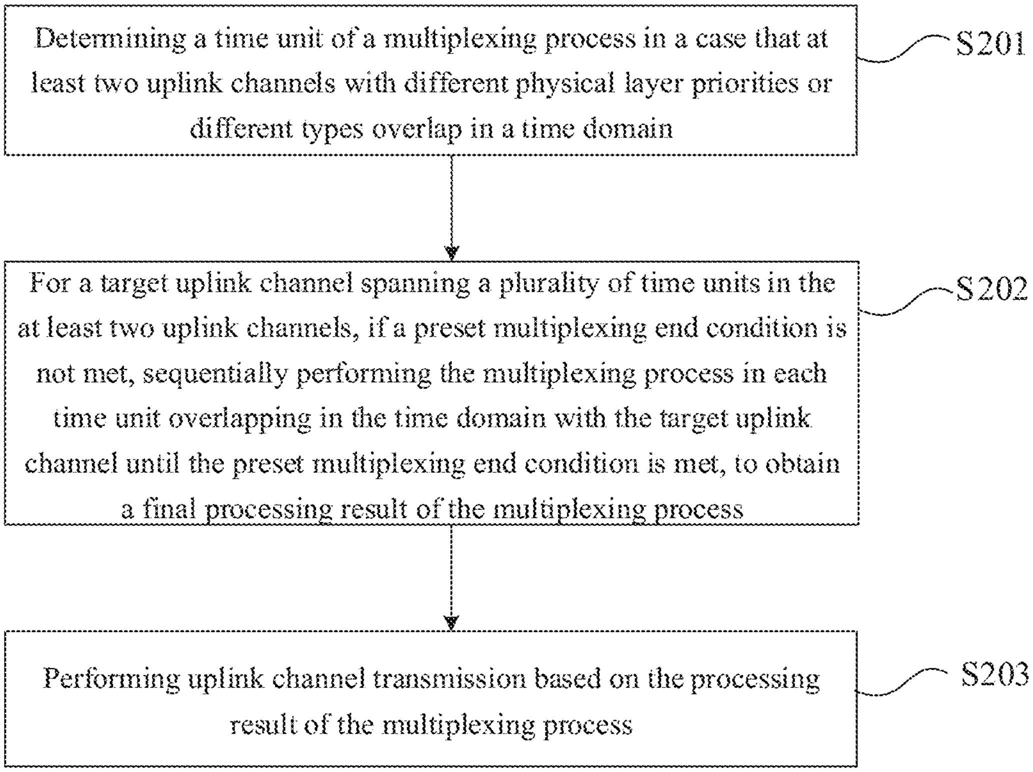
FIG. 2 is a flowchart of an uplink multiplexing transmission method provided by an embodiment of the present disclosure.

FIG. 2 is an uplink multiplexing transmission method provided by an embodiment of the present disclosure. The uplink multiplexing transmission method is applied to a terminal or a network device such as a base station. As shown in FIG. 2, the specific steps of the method are as follows.

S201, determining a time unit of a multiplexing process in a case that at least two uplink channels with different physical layer priorities or different types overlap in a time domain.

In this embodiment, a definition of two-level physical layer priorities is introduced for an uplink channel in the version Rel-16 of the 5G standard, that is, an uplink supports two kinds of physical channels with different physical layer priorities, including an uplink channel with a high priority (HP) and an uplink channel with a low priority (LP). A precondition of this embodiment is that the terminal is configured to support multiplexing transmission for different priorities. If the uplink channels with different physical layer priorities overlap in the time domain, a multiplexing process is required, and a time unit of the multiplexing process may be determined first to facilitate multiplexing of the uplink channels in the time unit of each multiplexing process.

In an implementation, in the case that the at least two uplink channels with different physical layer priorities overlap in the time domain, when determining the time unit of the multiplexing process, since transmission time units of HARQ-ACKs in the uplink channels with different physical layer priorities may be different, the time unit of the multiplexing process may be determined according to the transmission time units of the HARQ-ACKs with different physical layer priorities.

A transmission time unit of a HARQ-ACK may be a slot (Slot) or a sub-slot (Sub-slot). For example, when the transmission time unit of the HARQ-ACK is a sub-slot, a length of the sub-slot may be 7 or 6 OFDM symbols, or 2 OFDM symbols.

Further, in this embodiment, a transmission time unit of a HARQ-ACK with a high priority among the different physical layer priorities may be determined as the time unit of the multiplexing process.

In another embodiment, there may be a case that at least two uplink channels with different types overlap in the time domain. For example, an MBS PUCCH and a unicast PUCCH conflict in a time domain, and it is necessary to perform a multiplexing process. A time unit of the multiplexing process may also be determined first to facilitate multiplexing of the uplink channels in the time unit of each multiplexing process.

Specifically, in the case that the at least two uplink channels overlapping in the time domain are at least two uplink channels with different types, when determining the time unit of the multiplexing process, a transmission time unit of an uplink channel with a shorter transmission time unit among the at least two uplink channels may be determined as the time unit of the multiplexing process; or, a transmission time unit of an uplink channel with a target type among the at least two uplink channels is determined as the time unit of the multiplexing process.

For example, for a time domain overlap between the MBS PUCCH and the unicast PUCCH, a transmission time unit corresponding to one of the uplink channels may be determined as the time unit of the multiplexing process, such as selecting the smallest transmission time unit as the time unit of the multiplexing process, or always selecting the transmission time unit of the MBS PUCCH as the time unit of the multiplexing process, or always selecting the transmission time unit of the unicast PUCCH as the time unit of the multiplexing process.

S202, for a target uplink channel spanning a plurality of time units in the at least two uplink channels, if a preset multiplexing end condition is not met, sequentially performing the multiplexing process in each time unit overlapping in the time domain with the target uplink channel until the preset multiplexing end condition is met, to obtain a final processing result of the multiplexing process.

In this embodiment, after determining the time unit of the multiplexing process, there may be a target uplink channel spanning a plurality of time units in the at least two uplink channels. Since the target uplink channel spanning a plurality of time units has a transmission time unit different from a transmission time unit of an uplink channel not spanning time units, when the preset multiplexing end condition is not met, the multiplexing process may be sequentially performed in each time unit overlapping in the time domain with the target uplink channel until the preset multiplexing end condition is met.

In an implementation, the preset multiplexing end condition being met may be that there is currently no uplink channel that needs the multiplexing process, for example, there is no time domain overlap of PUCCHs. Specifically, the preset multiplexing end condition may be that an uplink channel with a time domain overlap is dropped or successfully multiplexed with a further uplink channel.

In an implementation, when sequentially performing the multiplexing process in each time unit overlapping in the time domain with the target uplink channel, the method may specifically include:

- determining all PUCCHs in a time unit of a current multiplexing process as a Q set, and executing the multiplexing process according to a multiplexing rule in a case of time domain overlapping to obtain a PUCCH with no time domain overlap in the time unit of the current multiplexing process.

In this embodiment, in a process of sequentially performing the multiplexing process, for the time unit of the current multiplexing process, all PUCCHs (including PUCCHs with the same priority and PUCCHs with different priorities) therein can be determined as a Q set, and then the multiplexing process can be performed on the PUCCHs in the Q set according to the multiplexing rule in the case of time domain overlapping. For example, UCI (Uplink Control Information) with a preset type, which is carried by at least one uplink channel in the Q set, is transferred to another uplink channel in the Q set for multiplexing, where the UCI may include at least one of a HARQ-ACK, an SR (Scheduling Request) and CSI (Channel State Information); or, a new uplink channel may be created separately, and the UCI with the preset type, which is carried by at least one uplink channel in the Q set, can be transferred to the new uplink channel for multiplexing. The UCI with the preset type is UCI that supports multiplexing between the uplink channels. For example, the UCI that supports multiplexing may be the HARQ-ACK, while the SR and the CSI do not support multiplexing. Then in multiplexing, only a HARQ-ACK of a certain uplink channel is carried onto another uplink channel for multiplexing, for example, the HARQ-ACK is transferred from a LP PUCCH to a HP PUCCH for multiplexing, while the SR and the CSI can be dropped.

S203, performing uplink channel transmission based on the processing result of the multiplexing process.

In this embodiment, after completing the multiplexing process to obtain the final processing result of the multiplexing process, uplink channel transmission can be performed based on the processing result. Specifically, if an executive entity of the uplink multiplexing transmission method provided in this embodiment is the terminal, the terminal performs the uplink channel transmission to the base station; and if the executive entity of the uplink multiplexing transmission method provided in this embodiment is the base station, the base station receives the uplink channel transmitted by the terminal.

The uplink multiplexing transmission method provided by this embodiment is applied to the terminal or the base station. The time unit of the multiplexing process is determined in the case that at least two uplink channels with different physical layer priorities or different types overlap in the time domain; for the target uplink channel spanning a plurality of time units in the at least two uplink channels, if the preset multiplexing end condition is not met, the multiplexing process is performed sequentially in each time unit overlapping in the time domain with the target uplink channel until the preset multiplexing end condition is met, to obtain the final processing result of the multiplexing process; and the uplink channel transmission is performed based on the processing result of the multiplexing process. In this embodiment, in the case that the uplink channels overlap in the time domain, by sequentially performing the multiplexing process in the time unit of each multiplexing process until the preset multiplexing end condition is met, uplink control information carried by an uplink channel with a time domain overlap can be multiplexed to a further channel, so that uplink multiplexing transmission can be effectively performed, and influence caused by dropping an uplink channel can be reduced.

Figure 3:
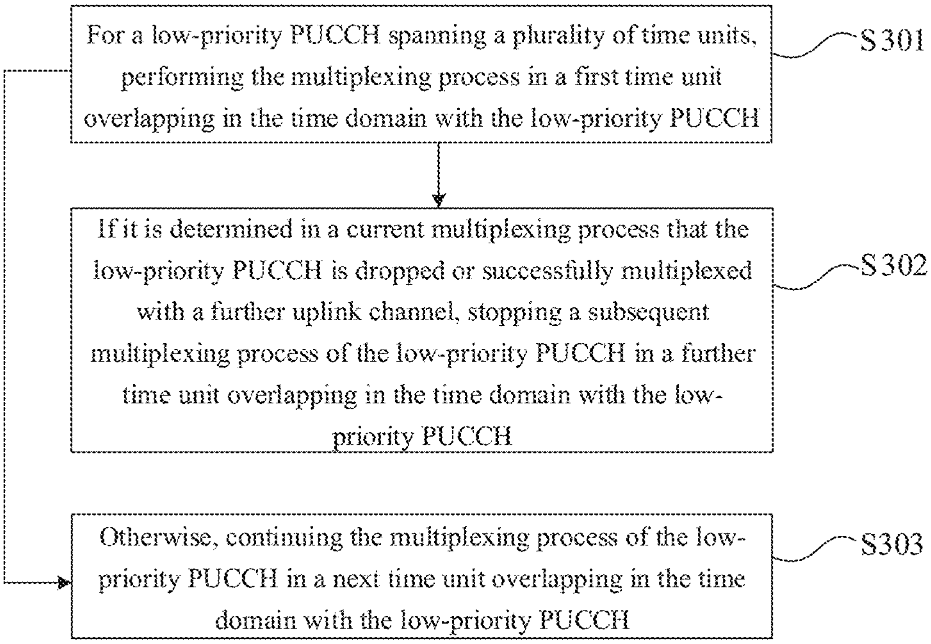
FIG. 3 is a flowchart of an uplink multiplexing transmission method provided by another embodiment of the present disclosure.

On the basis of any of the above embodiments, as shown in FIG. 3, sequentially performing the multiplexing process in each time unit overlapping in the time domain with the target uplink channel until the preset multiplexing end condition is met as described in S202 may specifically include:

- S301, for a low-priority PUCCH spanning a plurality of time units, performing the multiplexing process in a first time unit overlapping in the time domain with the low-priority PUCCH;
- S302, if it is determined in a current multiplexing process that the low-priority PUCCH is dropped or successfully multiplexed with a further uplink channel, stopping a subsequent multiplexing process of the low-priority PUCCH in a further time unit overlapping in the time domain with the low-priority PUCCH;
- S303, otherwise, continuing the multiplexing process of the low-priority PUCCH in a next time unit overlapping in the time domain with the low-priority PUCCH;
- repeating the above process until the low-priority PUCCH is dropped or successfully multiplexed with a further uplink channel.

In this embodiment, in the presence of a low-priority PUCCH spanning a plurality of time units, when the low-priority PUCCH is not dropped and not successfully multiplexed with a further uplink channel, it can sequentially participate in the multiplexing process in each time unit overlapping in the time domain with the low-priority PUCCH until the low-priority PUCCH is dropped or successfully multiplexed with a further uplink channel.

Specifically, the multiplexing process is firstly performed in the first time unit overlapping in the time domain with the low-priority PUCCH. If it is determined that the low-priority PUCCH is dropped or successfully multiplexed with a further uplink channel in the multiplexing process in the first time unit, multiplexing processes of the low-priority PUCCH in other subsequent time units overlapping in the time domain with the low-priority PUCCH are stopped. If the low-priority PUCCH is not dropped and not successfully multiplexed with a further uplink channel, the multiplexing process is performed in a second time unit overlapping in the time domain with the low-priority PUCCH. Similarly, if it is determined that the low-priority PUCCH is dropped or successfully multiplexed with a further uplink channel in the multiplexing process in the second time unit, the multiplexing processes of the low-priority PUCCH in other subsequent time units overlapping with the low-priority PUCCH in the time domain are stopped. If the low-priority PUCCH is not dropped and not successfully multiplexed with a further uplink channel, the multiplexing process is performed in a third time unit overlapping in the time domain with the low-priority PUCCH. The rest can be done in the same manner, until the low-priority PUCCH is dropped or successfully multiplexed with a further uplink channel, or until the multiplexing process in the last time unit overlapping in the time domain with the low-priority PUCCH is completed.

It should be noted that, if there is no uplink channel overlapping in the time domain with the target uplink channel in the time unit of the current multiplexing process, the multiplexing process is continued in a next time unit overlapping in the time domain with the target uplink channel. As in the above embodiment, if it is found that there is no uplink channel overlapping in the time domain with the low-priority PUCCH in the multiplexing process in the first time unit, the multiplexing process in the first time unit is unnecessary, and the multiplexing process in the second time unit can be continued. Similarly, if there is no uplink channel overlapping in the time domain with the low-priority PUCCH in the second time unit, the multiplexing process in the third time unit can be continued, and so on.

On the basis of the above embodiments, in a process of sequentially performing the multiplexing process in each time unit overlapping in the time domain with the target uplink channel as described in S202, the method may further include:

- if a preset condition is met, performing a dropping operation on at least one uplink channel in the Q set, where the preset condition includes:
- in the time unit of the current multiplexing process, the uplink channel obtained through the multiplexing process still spans a plurality of time units; or
- in the time unit of the current multiplexing process, the uplink channel obtained through the multiplexing process is located in a further time unit; or
- in the time unit of the current multiplexing process, a starting position of the uplink channel obtained through the multiplexing process is earlier than a starting position of the time unit of the current multiplexing process.

In this embodiment, by judging the preset condition in the multiplexing process, it can be determined whether to perform the dropping operation on the uplink channel, so as to avoid continuing the subsequent multiplexing process.

On the basis of the above embodiments, performing the dropping operation on the at least one uplink channel in the Q set may specifically include:

- if physical layer priorities of uplink channels in the Q set are different, dropping a low-priority uplink channel; or
- if physical layer priorities of uplink channels in the Q set are identical, dropping an uplink channel carrying a low-priority UCI type based on preset priorities of UCI types carried by the uplink channels.

In this embodiment, when it is determined that a dropping operation needs to be performed on at least one uplink channel in the Q set, if the physical layer priorities of the uplink channels in the Q set are different, the low-priority uplink channel is dropped; and if the physical layer priorities of the uplink channels in the Q set are identical, which uplink channel or channels to drop can be determined according to the UCI types carried by the uplink channels. The preset priorities of the UCI types can be preset. In an implementation, an order of the preset priorities of the UCI types is: HARQ-ACK>SR>CSI. If it is necessary to drop one uplink channel in two LP PUCCHs, where the UCI type carried by the first LP PUCCH is HARQ-ACK and the UCI type carried by the second LP PUCCH is CSI, the second LP PUCCH is dropped because the priority of HARQ-ACK is higher than that of CSI.

The above embodiment describes the case of the uplink channels with different physical layer priorities overlapping in the time domain. An implementation of the case of at least two uplink channels with different types overlapping in the time domain is similar to the implementation of the above. For example, after determining the time unit of the multiplexing process, if a PUCCH with a first type spans a plurality of time units, and if a preset multiplexing end condition is not met, the multiplexing process is sequentially performed in each time unit overlapping in the time domain with the PUCCH until the preset multiplexing end condition is met, to obtain a final processing result of the multiplexing process. Specifically, the multiplexing process can be performed in a first time unit overlapping in the time domain with the PUCCH. If it is determined in a current multiplexing process that the PUCCH is dropped or successfully multiplexed with a further uplink channel, subsequent multiplexing processes of the PUCCH in other time units overlapping in the time domain with the PUCCH are stopped. Otherwise, the multiplexing process of the PUCCH is continued in a next time unit overlapping in the time domain with the PUCCH. The above process is repeated until the PUCCH is dropped or successfully multiplexed with a further uplink channel. Finally, uplink channel transmission is performed based on the processing result of the multiplexing process. The preset condition of the dropping operation is the same as that of the above embodiment. The dropping operation may be performed in accordance with the physical layer priority or the priority of the UCI type, and of course, may also be performed in other orders or other preset rules, which is not limited here.

On the basis of any of the above embodiments, the uplink multiplexing transmission method further includes:

- in a case that a PUCCH in the processing result of the multiplexing process and a physical uplink shared channel PUSCH overlap in the time domain, if it is determined that the terminal supports parallel transmission of the PUCCH and the PUSCH, transmitting the PUCCH and the PUSCH simultaneously;
- if it is determined that the terminal does not support the parallel transmission of the PUCCH and the PUSCH, performing multiplexing transmission on the PUCCH and the PUSCH, or dropping one of the uplink channels.

In this embodiment, a time domain overlap of the PUCCH and the PUSCH may also exist in the above embodiments. For example, if there is a time domain overlap of multiple PUCCHs and also an overlap with the PUSCH at the same time, the process of S201-S203 can be performed first to obtain a PUCCH that does not overlap in the time domain. If the PUCCH that does not overlap in the time domain overlaps with the PUSCH at this time, it can be determined first whether the terminal supports the parallel transmission of the PUCCH and the PUSCH. If the terminal supports the parallel transmission of the PUCCH and the PUSCH, the PUCCH and PUSCH can be transmitted simultaneously. If the terminal does not support the parallel transmission of the PUCCH and the PUSCH, the multiplexing transmission is performed on the PUCCH and the PUSCH or one of the uplink channels is dropped. The multiplexing transmission can transfer UCI carried by the PUCCH onto the PUSCH for multiplexing, and of course, UCI carried by the PUSCH can also be transferred onto the PUCCH for multiplexing. It should be noted that whether the terminal supports the parallel transmission of the PUCCH and the PUSCH can be controlled by the base station, or can be set by a terminal user, or can be controlled by other means.

The uplink multiplexing transmission method in the above embodiments will be described in detail with specific examples in the following. The examples described therein are only some embodiments, not all embodiments, of the uplink multiplexing transmission method provided by the present disclosure.

On a primary carrier (Master (primary) Cell Group, MCG), a high-priority HARQ-ACK is configured to be transmitted based on a Sub-slot with a length of 7 symbols, and a low-priority HARQ-ACK is configured to be transmitted based on a Slot, so the transmission time unit of the high-priority HARQ-ACK, Sub-slot, is taken as the time unit of the multiplexing process.

Figure 4:
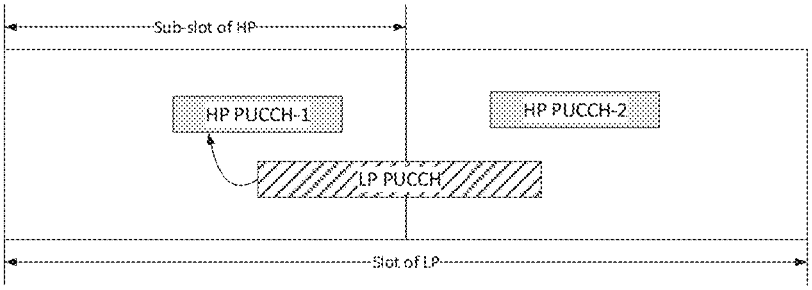
FIG. 4 is a schematic diagram of a multiplexing process of an uplink multiplexing transmission method provided by an embodiment of the present disclosure.

Case 1: As shown in FIG. 4, one low-priority LP PUCCH overlaps with two high-priority Sub-slots in the time domain, and overlaps with one high-priority HP PUCCH in the time domain within each high-priority Sub-slot. In the time unit of the first multiplexing process of FIG. 4, the Q set is defined to include HP PUCCH-1 and the LP PUCCH. Based on the multiplexing rule in the case of time domain overlapping, the terminal may drop the LP PUCCH or transfer UCI information carried by the LP PUCCH onto HP PUCCH-1 for multiplexing transmission, so the LP PUCCH no longer participates in the multiplexing process in the second Sub-slot, and one HP PUCCH-1 is obtained in the time unit of the first multiplexing process through multiplexing. In the time unit of the second multiplexing process, there is only one HP PUCCH-2, and there are no channels overlapping in the time domain, so one HP PUCCH-2 is also obtained. Finally, the terminal transmits one HP PUCCH-1 (which may contain the transferred LP UCI) in the time unit of the first multiplexing process, where the LP PUCCH is dropped, and transmits one HP PUCCH-2 in the time unit of the second multiplexing process.

Figure 5:
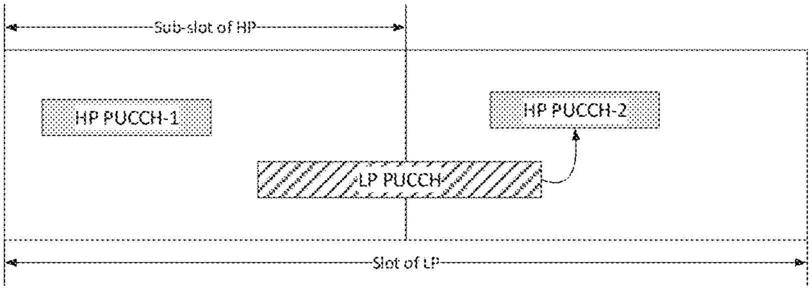
FIG. 5 is a schematic diagram of a multiplexing process of an uplink multiplexing transmission method provided by another embodiment of the present disclosure.

Case 2: As shown in FIG. 5, one low-priority LP PUCCH overlaps with two high-priority Sub-slots in the time domain, but does not overlap with a high-priority PUCCH within the first high-priority Sub-slot while overlaps with one high-priority PUCCH in the time domain within the second high-priority Sub-slot. In the time unit of the first multiplexing process of FIG. 5, since there is no time domain overlap and there is no need to perform the multiplexing process, the LP PUCCH is not dropped or multiplexed with a further uplink channel, and can continue to participate in the subsequent multiplexing process. In the time unit of the second multiplexing process, the Q set is defined to include HP PUCCH-2 and the LP PUCCH. Based on the multiplexing rule in the case of time domain overlapping, the terminal may drop the LP PUCCH or transfer UCI information carried by the LP PUCCH to HP PUCCH-2 for multiplexing transmission. Finally, the terminal transmits one HP PUCCH-1 in the time unit of the first multiplexing process, and transmits one HP PUCCH-2 in the time unit of the second multiplexing process (which may contain the transferred LP UCI), where the LP PUCCH is dropped.

Figure 6:
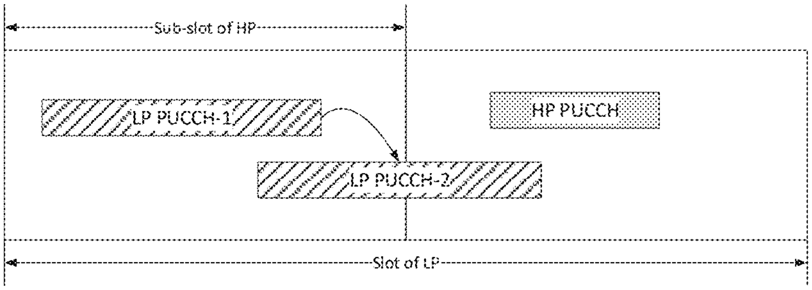
FIG. 6 is a schematic diagram of a multiplexing process of an uplink multiplexing transmission method provided by another embodiment of the present disclosure.

Case 3: As shown in FIG. 6, one low-priority LP PUCCH-2 overlaps with two high-priority Sub-slots in the time domain, and LP PUCCH-2 overlaps with one low-priority LP PUCCH-1 within the first high-priority Sub-slot and overlaps with one high-priority HP PUCCH in the time domain within the second high-priority Sub-slot. In the time unit of the first multiplexing process of FIG. 6, the Q set is defined to include LP PUCCH-1 and LP PUCCH-2. Based on the multiplexing rule in the case of time domain overlapping, the terminal may transfer UCI information carried by LP PUCCH-1 onto LP PUCCH-2 for multiplexing transmission. Assuming that LP PUCCH-1 carries LP HARQ-ACK and LP PUCCH-2 carries LP CSI, LP HARQ-ACK and LP CSI are carried on the LP PUCCH-2 resource after multiplexing. In the time unit of the second multiplexing process, the Q set is defined to include the HP PUCCH and LP PUCCH-2. Based on the multiplexing rule in the case of time domain overlapping, the terminal may transfer UCI information carried by LP PUCCH-2 onto the HP PUCCH for multiplexing transmission. Further, in an implementation, if only multiplexing of LP HARQ-ACK and HP HARQ-ACK is supported and multiplexing of LP CSI and HP HARQ-ACK is not supported, the LP HARQ-ACK carried by LP PUCCH-2 is transferred onto the HP PUCCH for transmission, and the LP CSI cannot be transferred to the HP PUCCH for transmission and is dropped. Finally, the terminal does not transmit any channel in the time unit of the first multiplexing process and transmits one HP PUCCH-2 (which may contain the transferred LP HARQ-ACK) in the time unit of the second multiplexing process, where both LP PUCCH-1 and LP PUCCH-2 are dropped.

Figure 7:
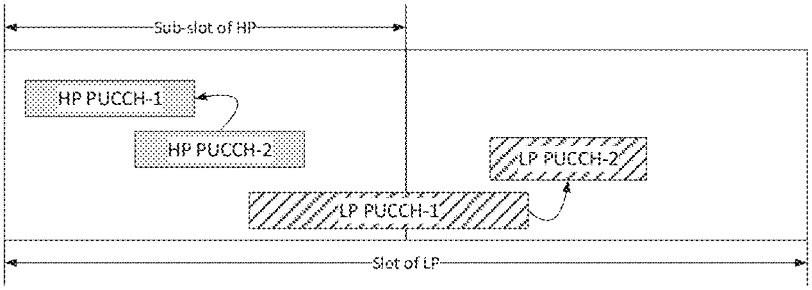
FIG. 7 is a schematic diagram of a multiplexing process of an uplink multiplexing transmission method provided by another embodiment of the present disclosure.

Case 4: As shown in FIG. 7, one low-priority LP PUCCH-1 overlaps with two high-priority Sub-slots in the time domain, and LP PUCCH-1 overlaps with one high-priority HP PUCCH-2 within the first high-priority Sub-slot (where the high-priority HP PUCCH-2 overlaps with one high-priority HP PUCCH-1) and overlaps with one low-priority LP PUCCH-2 in the time domain within the second high-priority Sub-slot. In the time unit of the first multiplexing process of FIG. 7, the Q set is defined to include HP PUCCH-1, HP PUCCH-2 and LP PUCCH-1. Based on the multiplexing rule in the case of time domain overlapping, the terminal may transfer UCI information carried by HP PUCCH-2 onto HP PUCCH-1 for multiplexing transmission. Two channels, HP PUCCH-1 and LP PUCCH-1, are obtained after multiplexing, and LP PUCCH-1 can continue to participate in the subsequent multiplexing process. In the time unit of the second multiplexing process, the Q set is defined to include LP PUCCH-1 and LP PUCCH-2. Based on the multiplexing rule in the case of time domain overlapping, the terminal may transfer UCI information carried by LP PUCCH-1 onto LP PUCCH-2 for multiplexing transmission, and then the LP PUCCH-2 channel is obtained after multiplexing. Finally, the terminal transmits HP PUCCH-1 (which contains the transferred UCI information of HP PUCCH-2) in the time unit of the first multiplexing process and transmits one LP PUCCH-2 (which contains the transferred UCI information of LP PUCCH-1) in the time unit of the second multiplexing process, where both HP PUCCH-2 and LP PUCCH-1 are dropped.

Example 2

On a primary carrier, a high-priority HARQ-ACK is configured to be transmitted based on a Sub-slot with a length of 7 symbols, and a low-priority HARQ-ACK is configured to be transmitted based on a Slot, so the Sub-slot of the high-priority HARQ-ACK is taken as the time unit of the multiplexing process.

Figure 8:
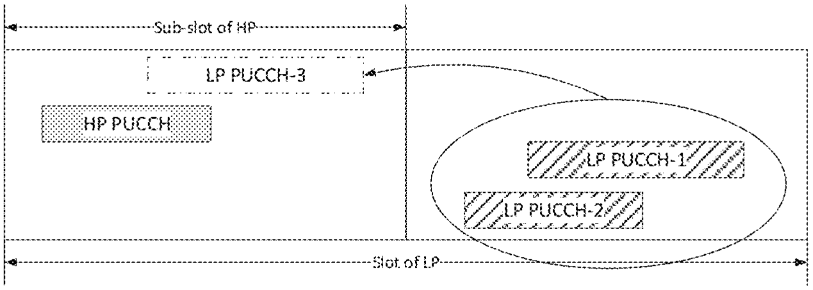
FIG. 8 is a schematic diagram of a multiplexing process of an uplink multiplexing transmission method provided by another embodiment of the present disclosure.

Case 1: As shown in FIG. 8, there is only one HP PUCCH within the first high-priority Sub-slot, and one LP PUCCH-1 and one LP PUCCH-2 overlap within the second high-priority sub-slot. In the time unit of the first multiplexing process of FIG. 8, since there is no overlap, there is no need to perform the multiplexing process. In the time unit of the second multiplexing process, the Q set is defined to include LP PUCCH-1 and LP PUCCH-2. Based on the multiplexing rule in the case of time domain overlapping, the terminal may choose a new LP PUCCH-3 for multiplexing transmission. As shown in FIG. 8, since LP PUCCH-3 is located in the time unit of the previous multiplexing process, which meets the preset condition mentioned in the above embodiments, the multiplexing of LP PUCCH-1 and LP PUCCH-2 is not supported. Further, in an implementation, assuming that LP PUCCH-1 carries HARQ-ACK and LP PUCCH-2 carries CSI/SR, then LP PUCCH-2 and UCI carried by it are dropped, and only LP PUCCH-1 is transmitted in the time unit of the second multiplexing process. Finally, the terminal transmits one HP PUCCH in the time unit of the first multiplexing process and transmits one LP PUCCH-1 (which does not contain the transferred LP UCI) in the time unit of the second multiplexing process, where LP PUCCH-2 is dropped.

Figure 9:
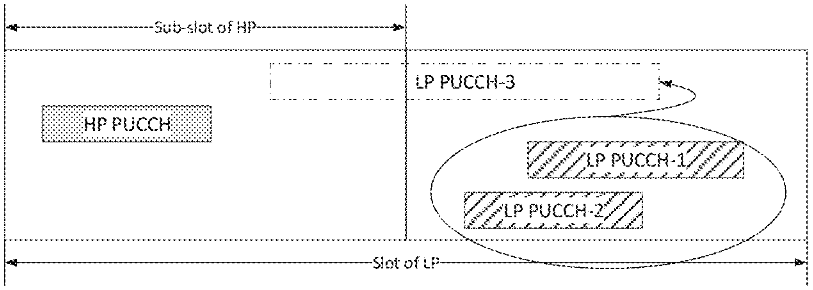
FIG. 9 is a schematic diagram of a multiplexing process of an uplink multiplexing transmission method provided by another embodiment of the present disclosure.

Similarly, in Case 1 of this example, if in the time unit of the second multiplexing process, as shown in FIG. 9, it is determined that a starting position of the multiplexed LP PUCCH-3 is earlier than the time unit of the current multiplexing process, or it is determined that a resource of the multiplexed LP PUCCH-3 spans out the time unit of the current multiplexing process, transmission of LP PUCCH-2 may not be supported, and only LP PUCCH-1 may be transmitted.

Figure 10:
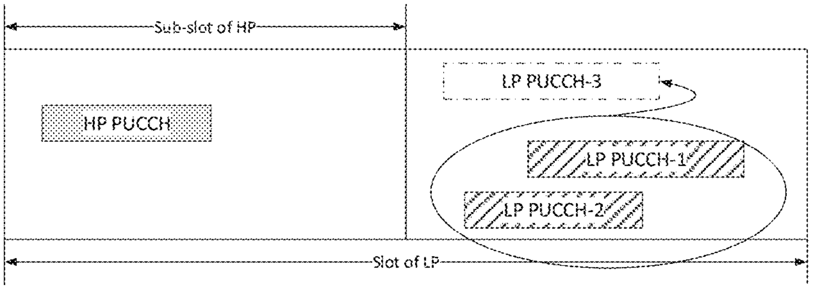
FIG. 10 is a schematic diagram of a multiplexing process of an uplink multiplexing transmission method provided by another embodiment of the present disclosure.

Case 2: As shown in FIG. 10, there is only one HP PUCCH within the first high-priority Sub-slot, and one LP PUCCH-1 and one LP PUCCH-2 overlap within the second high-priority Sub-slot. In the time unit of the first multiplexing process of FIG. 10, since there is no overlap, there is no need to perform the multiplexing process. In the time unit of the second multiplexing process, the Q set is defined to include LP PUCCH-1 and LP PUCCH-2. Based on the multiplexing rule in the case of time domain overlapping, the terminal may choose a new LP PUCCH-3 for multiplexing transmission. As shown in FIG. 10, since LP PUCCH-3 is located in the time unit of the current multiplexing process, multiplexing of LP PUCCH-1 and LP PUCCH-2 is supported. Assuming that LP PUCCH-1 carries HARQ-ACK and LP PUCCH-2 carries CSI/SR, then both the HARQ-ACK and CSI/SR are transferred onto LP PUCCH-3 for transmission. Finally, the terminal transmits one HP PUCCH in the time unit of the first multiplexing process and transmits one LP PUCCH-3 (which contains the transferred LP HARQ and CSI/SR) in the time unit of the second multiplexing process.

Figure 11:
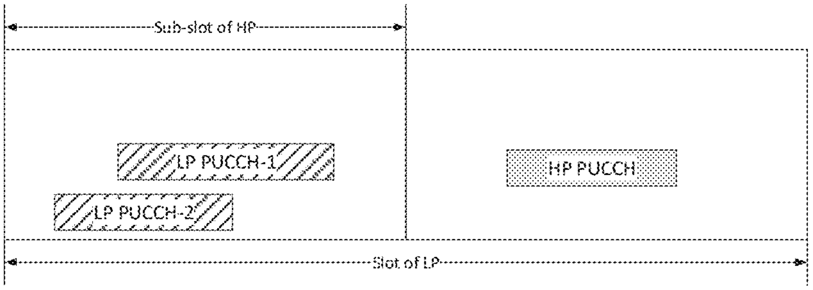
FIG. 11 is a schematic diagram of a multiplexing process of an uplink multiplexing transmission method provided by another embodiment of the present disclosure.
Figure 12:
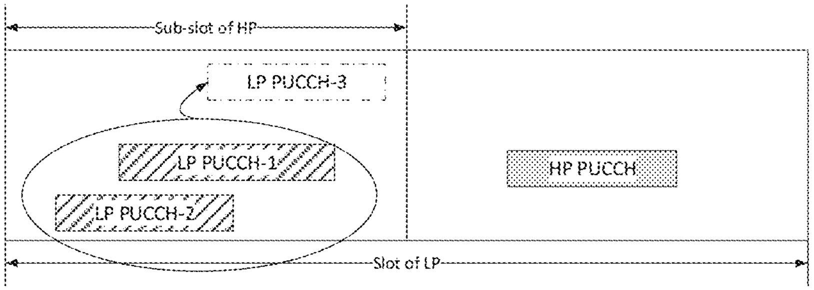
FIG. 12 is a schematic diagram of a multiplexing process of an uplink multiplexing transmission method provided by another embodiment of the present disclosure.
Figure 13:
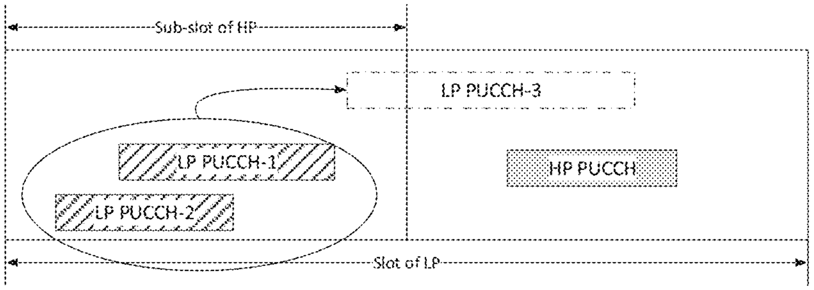
FIG. 13 is a schematic diagram of a multiplexing process of an uplink multiplexing transmission method provided by another embodiment of the present disclosure.
Figure 14:
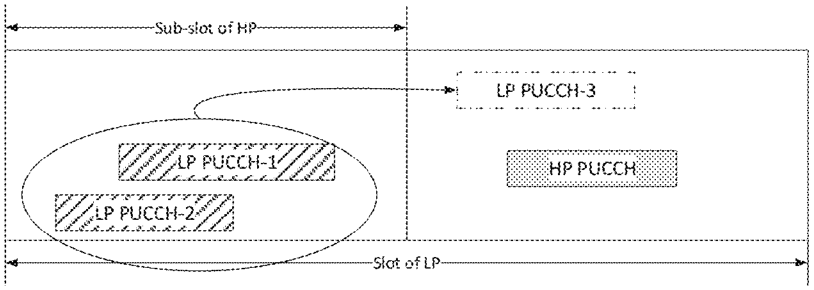
FIG. 14 is a schematic diagram of a multiplexing process of an uplink multiplexing transmission method provided by another embodiment of the present disclosure.

Case 3: As shown in FIG. 11, one LP PUCCH-1 and one LP PUCCH-2 overlap within the first high-priority Sub-slot, and there is only one HP PUCCH within the second high-priority Sub-slot. In the time unit of the first multiplexing process of FIG. 11, the Q set is defined to include LP PUCCH-1 and LP PUCCH-2. Based on the multiplexing rule in the case of time domain overlapping, the terminal may perform multiplexing transmission through a new LP PUCCH-3, as shown in FIG. 12-FIG. 14.

Case 3-1: As shown in FIG. 12, LP PUCCH-3 is located in the time unit of the current multiplexing process, then multiplexing of LP PUCCH-1 and LP PUCCH-2 are supported. Finally, the terminal transmits one LP PUCCH-3 (which contains the transferred LP UCI of LP PUCCH-1 and LP PUCCH-2) in the time unit of the first multiplexing process and transmits one HP PUCCH in the time unit of the second multiplexing process.

Case 3-2: As shown in FIG. 13 or FIG. 14, LP PUCCH-3 spans time units of a plurality of multiplexing processes or is located in a time unit of a further multiplexing process, then any of the following modes may be adopted.

Mode 1: Multiplexing of LP PUCCH-1 and LP PUCCH-2 is not supported. Assuming that LP PUCCH-1 carries HARQ-ACK and LP PUCCH-2 carries CSI/SR, LP PUCCH-2 and UCI carried by it are dropped according to the preset priorities of the UCI types, and only LP PUCCH-1 is transmitted in the time unit of the first multiplexing process. Finally, the terminal transmits one LP PUCCH-1 (which does not contain the transferred LP UCI) in the time unit of the first multiplexing process, where LP PUCCH-2 is dropped, and transmits one HP PUCCH in the time unit of the second multiplexing process.

Mode 2: Multiplexing of LP PUCCH-1 and LP PUCCH-2 is supported. Assuming that LP PUCCH-1 carries HARQ-ACK and LP PUCCH-2 carries CSI/SR, a new LP PUCCH-3 is obtained through the multiplexing process in the time unit of the first multiplexing process. In the time unit of the second multiplexing process, the Q set is defined to include LP PUCCH-3 and HP PUCCH. Based on the multiplexing rule in the case of time domain overlapping, the terminal may perform multiplexing transmission through the HP PUCCH. Finally, the terminal does not transmit any channel in the time unit of the first multiplexing process and transmits one HP PUCCH (which contains the transferred LP HARQ-ACK) in the time unit of the second multiplexing process.

With the uplink multiplexing transmission method provided by the above embodiments, uplink multiplexing transmission can be effectively performed in the case that uplink channels overlap in the time domain, thereby reducing influence caused by dropping the uplink channel.

Figure 15:
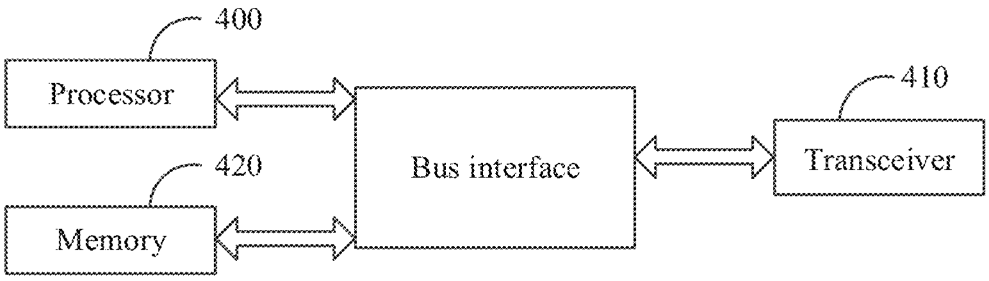
FIG. 15 is a structural diagram of an uplink multiplexing transmission apparatus provided by an embodiment of the present disclosure.

FIG. 15 is a schematic structural diagram of an uplink multiplexing transmission apparatus provided by an embodiment of the present disclosure. The uplink multiplexing transmission apparatus of the present disclosure may be a terminal or a network device such as a base station. As shown in FIG. 15, the uplink multiplexing transmission apparatus 40 includes a transceiver 400, a processor 410 and a memory 420.

The transceiver 400 is configured to transmit and receive data under control of the processor 410.

In FIG. 15, a bus architecture may include any number of interconnected buses and bridges. Specifically, various circuits of one or more processors represented by the processor 410 and the memory represented by the memory 420 are linked together. The bus architecture may also link together various other circuits, such as a peripheral device, a voltage regulator and a power management circuit, which are well known in the art and are therefore not described further herein. A bus interface provides an interface. The transceiver 400 may be a plurality of elements, that is, including a transmitter and a receiver, and providing units for communicating with various other apparatuses on transmission mediums. These transmission mediums include transmission mediums such as a wireless channel, a wired channel, an optical cable and the like. The processor 410 is responsible for managing the bus architecture and general processing, and the memory 420 can store data used by the processor 410 when performing operations.

The memory 420 is configured to store a computer program, and includes but is not limited to various mediums that can store program code, such as: a USB flash drive, a removable hard disk, a read-only memory (ROM), a random access memory (RAM), a magnetic disk or an optical disk.

The processor 410 may be a central processing unit (CPU), an application specific integrated circuit (ASIC), a field-programmable gate array (FPGA) or a complex programmable logic device (CPLD), and the processor may also adopt a multi-core architecture.

The processor 410 is configured to read the computer program in the memory and perform the following operations:

determining a time unit of a multiplexing process in a case that at least two uplink channels with different physical layer priorities or different types overlap in a time domain;

for a target uplink channel spanning a plurality of time units in the at least two uplink channels, if a preset multiplexing end condition is not met, sequentially performing the multiplexing process in each time unit overlapping in the time domain with the target uplink channel until the preset multiplexing end condition is met, to obtain a final processing result of the multiplexing process;

performing uplink channel transmission based on the processing result of the multiplexing process.

In an implementation, when sequentially performing the multiplexing process in each time unit overlapping in the time domain with the target uplink channel until the preset multiplexing end condition is met, the processor 410 is configured to:

for a low-priority PUCCH spanning a plurality of time units, perform the multiplexing process in a first time unit overlapping in the time domain with the low-priority PUCCH;

if it is determined in a current multiplexing process that the low-priority PUCCH is dropped or successfully multiplexed with a further uplink channel, stop a subsequent multiplexing process of the low-priority PUCCH in a further time unit overlapping in the time domain with the low-priority PUCCH;

otherwise, continue the multiplexing process of the low-priority PUCCH in a next time unit overlapping in the time domain with the low-priority PUCCH;

repeat above process until the low-priority PUCCH is dropped or successfully multiplexed with a further uplink channel.

In an implementation, when sequentially performing the multiplexing process in each time unit overlapping in the time domain with the target uplink channel, the processor 410 is configured to:

determine all PUCCHs in a time unit of a current multiplexing process as a Q set, and execute the multiplexing process according to a multiplexing rule in a case of time domain overlapping, to obtain a PUCCH with no time domain overlap in the time unit of the current multiplexing process.

In an implementation, in a process of sequentially performing the multiplexing process in each time unit overlapping in the time domain with the target uplink channel, the processor 410 is further configured to:

if a preset condition is met, perform a dropping operation on at least one uplink channel in the Q set, where the preset condition includes:

in the time unit of the current multiplexing process, the uplink channel obtained through the multiplexing process still spans a plurality of time units; or in the time unit of the current multiplexing process, the uplink channel obtained through the multiplexing process is located in a further time unit; or in the time unit of the current multiplexing process, a starting position of the uplink channel obtained through the multiplexing process is earlier than a starting position of the time unit of the current multiplexing process.

In an implementation, when performing the dropping operation on the at least one uplink channel in the Q set, the processor 410 is configured to:

if physical layer priorities of uplink channels in the Q set are different, drop a low-priority uplink channel; or if physical layer priorities of uplink channels in the Q set are identical, drop an uplink channel carrying a low-priority UCI type based on preset priorities of UCI types carried by the uplink channels.

In an implementation, an order of the preset priorities of the UCI types is: hybrid automatic repeat request acknowledgement HARQ-ACK>scheduling request SR>channel state information CSI.

In an implementation, the processor 410 is further configured to:

if there is no uplink channel overlapping in the time domain with the target uplink channel in the time unit of the current multiplexing process, continue the multiplexing process in a next time unit overlapping in the time domain with the target uplink channel.

In an implementation, the at least two uplink channels are at least two uplink channels with different physical layer priorities;

when determining the time unit of the multiplexing process, the processor 410 is configured to:

determine the time unit of the multiplexing process according to transmission time units of HARQ-ACKs with different physical layer priorities.

In an implementation, when determining the time unit of the multiplexing process according to the transmission time units of the HARQ-ACKs with different physical layer priorities, the processor 410 is configured to:

determine a transmission time unit of a HARQ-ACK with a high priority among the different physical layer priorities as the time unit of the multiplexing process.

In an implementation, the at least two uplink channels are at least two uplink channels with different types;

when determining the time unit of the multiplexing process, the processor 410 is configured to:

determine a transmission time unit of an uplink channel with a shorter transmission time unit among the at least two uplink channels as the time unit of the multiplexing process; or determine a transmission time unit of an uplink channel with a target type among the at least two uplink channels as the time unit of the multiplexing process.

In an implementation, the at least two uplink channels include an MBS PUCCH and a unicast PUCCH.

In an implementation, the processor 410 is further configured to:

in a case that a PUCCH in the processing result of the multiplexing process and a physical uplink shared channel PUSCH overlap in the time domain, if it is determined that the terminal supports parallel transmission of the PUCCH and the PUSCH, transmit the PUCCH and the PUSCH simultaneously;

if it is determined that the terminal does not support the parallel transmission of the PUCCH and the PUSCH, performing multiplexing transmission on the PUCCH and the PUSCH, or drop one of the uplink channels.

The uplink multiplexing transmission apparatus related to embodiments of the present disclosure may be a base station, and the base station may include a plurality of cells serving a terminal. According to different specific applications, a base station may also be referred to as an access point, or may be a device in an access network that communicates with a wireless terminal device through one or more sectors over an air interface, or may have other names. A network device can be used to interchange received air frames with Internet Protocol (IP) packets, and act as a router between the wireless terminal device and the rest of the access network, where the rest of the access network may include an Internet Protocol (IP) communication network. The network device can also coordinate attribute management of the air interface. For example, the network device related to the embodiments of the present disclosure may be a network device (BTS) in a global system for mobile communications (GSM) or code division multiple access (CDMA); may also be a network device (Node B) in wide-band code division multiple access (WCDMA), or an evolutional network device (evolutional Node B, eNB or e-NodeB) in a long term evolution (LTE) system, a 5G base station (gNB) in a 5G network architecture (next generation system); and may further be a home evolved base station (Home evolved Node B, HeNB), a relay node, a home base station (femto), a pico base station, etc., which are not limited in the embodiments of the present disclosure. In some network structures, the network device may include a centralized unit (CU) node and a distributed unit (DU) node, and a centralized unit and a distributed unit may also be geographically separated.

The uplink multiplexing transmission apparatus related to the embodiments of the present disclosure may also be a terminal device, which may be a device that provides voice and/or data connectivity to a user, a handheld device with a wireless connection function, or other processing devices connected to a wireless modem, etc. In different systems, the names of the terminal devices may be different. For example, in a 5G system, the terminal device may be called user equipment (UE). The wireless terminal device can communicate with one or more core networks (CNs) via a radio access network (RAN). The wireless terminal device may be a mobile terminal device such as a mobile phone (or “cellular” phone), and a computer with a mobile terminal device such as a portable, pocket-sized, hand-held, computer-built or vehicle-mounted mobile device, which exchanges voice and/or data with the radio access network. For example, the terminal may be a personal communication service (PCS) phone, a cordless phone, a session initiated protocol (SIP) phone, a wireless local loop (WWLL) station, a personal digital assistant (PDA) and other devices. The wireless terminal device may also be called a system, a subscriber, a subscriber station, a mobile station, a mobile, a remote station, an access point, a remote terminal device, an access terminal device, a user terminal device, a user agent, a user device, which is not limited in the embodiments of the present disclosure.

One or more antennas can be used between the network device and the terminal device for multi input multi output MIMO) transmission. The MIMO transmission may be single user MIMO (SU-MIMO) or multiple user MIMO (MU-MIMO). According to shape and number of antenna combinations, the MIMO transmission may be 2D-MIMO, 3D-MIMO, FD-MIMO or massive-MIMO, and may also be diversity transmission or precoding transmission or beamforming transmission, etc.

It should be noted here that the apparatuses such as the base station and the terminal device provided by the present disclosure can implement all the method steps implemented by the above method embodiments, and can achieve the same effects, so the parts of this embodiment which are same as the method embodiments and the beneficial effects will not be specifically detailed here.

Figure 16:
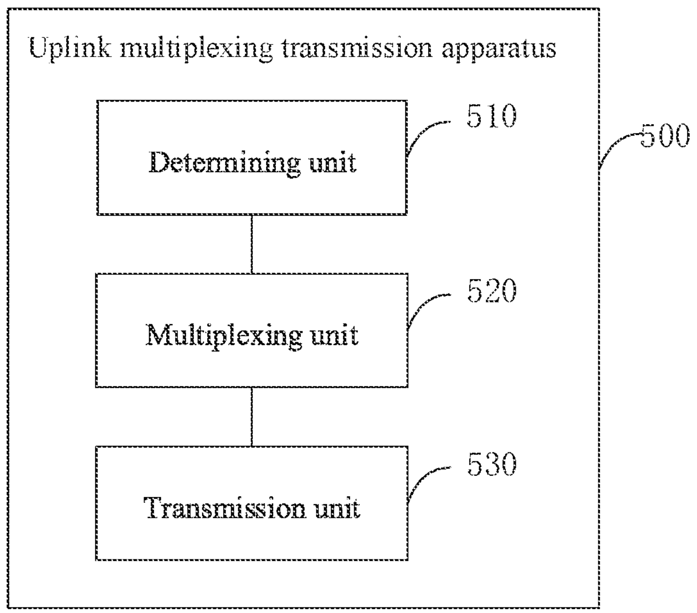
FIG. 16 is a structural diagram of an uplink multiplexing transmission apparatus provided by another embodiment of the present disclosure.

FIG. 16 is a schematic structural diagram of an uplink multiplexing transmission apparatus provided by an embodiment of the present disclosure. The uplink multiplexing transmission apparatus provided by this embodiment is applied to a terminal or a base station. As shown in FIG. 16, the uplink multiplexing transmission apparatus 50 includes a determining unit 510, a multiplexing unit 520 and a transmission unit 530.

The determining unit 510 is configured to determine a time unit of a multiplexing process in a case that at least two uplink channels with different physical layer priorities or different types overlap in a time domain.

The multiplexing unit 520 is configured to, for a target uplink channel spanning a plurality of time units in the at least two uplink channels, if a preset multiplexing end condition is not met, sequentially perform the multiplexing process in each time unit overlapping in the time domain with the target uplink channel until the preset multiplexing end condition is met, to obtain a final processing result of the multiplexing process.

The transmission unit 530 is configured to perform uplink channel transmission based on the processing result of the multiplexing process.

In an implementation, when sequentially performing the multiplexing process in each time unit overlapping in the time domain with the target uplink channel until the preset multiplexing end condition is met, the multiplexing unit 520 is configured to:

for a low-priority PUCCH spanning a plurality of time units, perform the multiplexing process in a first time unit overlapping in the time domain with the low-priority PUCCH;

if it is determined in a current multiplexing process that the low-priority PUCCH is dropped or successfully multiplexed with a further uplink channel, stop a subsequent multiplexing process of the low-priority PUCCH in a further time unit overlapping in the time domain with the low-priority PUCCH;

otherwise, continue the multiplexing process of the low-priority PUCCH in a next time unit overlapping in the time domain with the low-priority PUCCH;

repeat above process until the low-priority PUCCH is dropped or successfully multiplexed with a further uplink channel.

In an implementation, when sequentially performing the multiplexing process in each time unit overlapping in the time domain with the target uplink channel, the multiplexing unit 520 is configured to:

determine all PUCCHs in a time unit of a current multiplexing process as a Q set, and execute the multiplexing process according to a multiplexing rule in a case of time domain overlapping, to obtain a PUCCH with no time domain overlap in the time unit of the current multiplexing process.

In an implementation, in a process of sequentially performing the multiplexing process in each time unit overlapping in the time domain with the target uplink channel, the multiplexing unit 520 is further configured to:

if a preset condition is met, perform a dropping operation on at least one uplink channel in the Q set, where the preset condition includes:

in the time unit of the current multiplexing process, the uplink channel obtained through the multiplexing process still spans a plurality of time units; or in the time unit of the current multiplexing process, the uplink channel obtained through the multiplexing process is located in a further time unit; or in the time unit of the current multiplexing process, a starting position of the uplink channel obtained through the multiplexing process is earlier than a starting position of the time unit of the current multiplexing process.

In an implementation, when performing the dropping operation on the at least one uplink channel in the Q set, the multiplexing unit 520 is configured to:

if physical layer priorities of uplink channels in the Q set are different, drop a low-priority uplink channel; or if physical layer priorities of uplink channels in the Q set are identical, drop an uplink channel carrying a low-priority UCI type based on preset priorities of UCI types carried by the uplink channels.

In an implementation, an order of the preset priorities of the UCI types is: hybrid automatic repeat request acknowledgement HARQ-ACK>scheduling request SR>channel state information CSI.

In an implementation, the multiplexing unit 520 is further configured to:

if there is no uplink channel overlapping in the time domain with the target uplink channel in the time unit of the current multiplexing process, continue the multiplexing process in a next time unit overlapping in the time domain with the target uplink channel.

In an implementation, the at least two uplink channels are at least two uplink channels with different physical layer priorities;

when determining the time unit of the multiplexing process, the determining unit 510 is configured to:

determine the time unit of the multiplexing process according to transmission time units of HARQ-ACKs with different physical layer priorities.

In an implementation, when determining the time unit of the multiplexing process according to the transmission time units of the HARQ-ACKs with different physical layer priorities, the determining unit 510 is configured to:

determine a transmission time unit of a HARQ-ACK with a high priority among the different physical layer priorities as the time unit of the multiplexing process.

In an implementation, the at least two uplink channels are at least two uplink channels with different types;

when determining the time unit of the multiplexing process, the determining unit 510 is configured to:

determine a transmission time unit of an uplink channel with a shorter transmission time unit among the at least two uplink channels as the time unit of the multiplexing process; or determine a transmission time unit of an uplink channel with a target type among the at least two uplink channels as the time unit of the multiplexing process.

In an implementation, the at least two uplink channels with different types includes an MBS PUCCH and a unicast PUCCH.

In an implementation, the multiplexing unit 520 is further configured to:

in a case that a PUCCH in the processing result of the multiplexing process and a physical uplink shared channel PUSCH overlap in the time domain, if it is determined that the terminal supports parallel transmission of the PUCCH and the PUSCH, transmit the PUCCH and the PUSCH simultaneously;

if it is determined that the terminal does not support the parallel transmission of the PUCCH and the PUSCH, perform multiplexing transmission on the PUCCH and the PUSCH, or drop one of the uplink channels.

The uplink multiplexing transmission apparatus provided in this embodiment can be specifically used to execute the method procedure in any of the above method embodiments, and the specific functions and effects will not be repeated here.

It should be noted that the division of units in the embodiment of the present disclosure is schematic and is only a logical function division, and there may be other division manners in actual implementations. In addition, the functional units in the embodiments of the present disclosure may be integrated into one processing unit, or each unit may physically exist alone, or two or more units may be integrated into one unit. The above-integrated units can be realized either in the form of hardware or in the form of software functional units.

The integrated units may be stored in a processor-readable storage medium if being implemented in the form of software functional units and sold or used as an independent product. Based on this understanding, the essence of the embodiments of the present disclosure, or the part that contributes to the prior art, or all or a part of this embodiment may be embodied in the form of a software product. The computer software product is stored in a storage medium and includes several instructions to cause a computer device (which may be a personal computer, a server, or a network device, etc.) to perform all or part of the steps of the methods described in various embodiments of the present disclosure. The above storage medium includes various mediums that can store program code, such as: a USB flash drive, a removable hard disk, a read-only memory (ROM), a random access memory (RAM), a magnetic disk or an optical disk.

It should be noted here that the apparatus provided by the present disclosure can implement all the method steps implemented by the above method embodiments, and can achieve the same effects, so the parts of this embodiment which are same as the method embodiments and the beneficial effects will not be specifically detailed here.

The present disclosure also provides a processor-readable storage medium, where the processor-readable storage medium stores a computer program, and the computer program is used to cause a processor to execute the method provided by any of the method embodiments described above.

The processor-readable storage medium may be any available medium or data storage device that the processor is able to access, including, but not limited to, a magnetic memory (e.g., a floppy disk, a hard disk, a magnetic tape, a magneto-optical disk (MO), etc.), an optical memory (e.g., a CD, a DVD, a BD, a HVD, etc.), and a semiconductor memory (e.g., a ROM, an EPROM, an EEPROM, a non-volatile memory (NAND FLASH), a solid-state drive (SSD)), etc.

The present disclosure also provides a computer program product including a computer program, and the computer program is used to cause a processor to execute the method provided by any of the method embodiments described above.

The embodiments of the present disclosure may be provided as a method, a system, or a computer program product. Therefore, the present disclosure can take the form of an entire hardware embodiment, an entire software embodiment, or an embodiment combining software and hardware aspects. Moreover, the present disclosure may take the form of a computer program product implemented on one or more computer-usable storage mediums (including but not limited to a magnetic disk memory and an optical memory, etc.) that contain computer-usable program codes therein.

The present disclosure is described with reference to flowcharts and/or block diagrams of the methods, apparatuses (systems) and computer program products according to the embodiments of the present disclosure. It should be understood that each flow and/or block in the flowcharts and/or block diagrams, and combinations of the flows and/or blocks in the flowcharts and/or block diagrams can be implemented by computer-executable instructions. These computer-executable instructions may be provided to a processor of a general-purpose computer, a special-purpose computer, an embedded processor or other programmable data processing devices to produce a machine, such that the instructions executed by the processor of the computer or the other programmable data processing devices produce an apparatus for implementing the functions specified in one or more flows of the flowcharts and/or one or more blocks of the block diagrams.

These processor-executable instructions may also be stored in a processor-readable memory that can direct a computer or other programmable data processing devices to function in a particular manner, such that the instructions stored in the processor-readable memory produce an article of manufacture including an instruction apparatus that implements the functions specified in one or more flows of the flowcharts and/or one or more blocks of the block diagrams.

These processor-executable instructions may also be loaded onto a computer or other programmable data processing devices, such that a series of operational steps are performed on the computer or other programmable devices to produce computer-implemented processing, such that the instructions executed on the computer or other programmable devices provide steps for implementing the functions specified in one or more flows of the flowcharts and/or one or more blocks of the block diagrams.

The invention claimed is:

1. An uplink multiplexing transmission method, applied to a terminal or a base station, wherein the method comprises:

determining a time unit of a multiplexing process in a case that at least two uplink channels with different physical layer priorities or different types overlap in a time domain;

for a target uplink channel spanning a plurality of time units in the at least two uplink channels, upon determining that a preset multiplexing end condition is not met, sequentially performing the multiplexing process in each time unit overlapping in the time domain with the target uplink channel until the preset multiplexing end condition is met, to obtain a final processing result of the multiplexing process;

performing uplink channel transmission based on the processing result of the multiplexing process;

wherein sequentially performing the multiplexing process in each time unit overlapping in the time domain with the target uplink channel until the preset multiplexing end condition is met comprises:

for a low-priority physical uplink control channel (PUCCH) spanning a plurality of time units, performing the multiplexing process in a first time unit overlapping in the time domain with the low-priority PUCCH;

upon determining that in a current multiplexing process that the low-priority PUCCH is dropped or successfully multiplexed with a further uplink channel, stopping a subsequent multiplexing process of the low-priority PUCCH in a further time unit overlapping in the time domain with the low-priority PUCCH;

otherwise, continuing the multiplexing process of the low-priority PUCCH in a next time unit overlapping in the time domain with the low-priority PUCCH; repeating above process until the low-priority PUCCH is dropped or successfully multiplexed with a further uplink channel.

2. The method according to claim 1, wherein sequentially performing the multiplexing process in each time unit overlapping in the time domain with the target uplink channel comprises:

determining all PUCCHs in a time unit of a current multiplexing process as a Q set, and executing the multiplexing process according to a multiplexing rule in a case of time domain overlapping, to obtain a PUCCH with no time domain overlap in the time unit of the current multiplexing process.

3. The method according to claim 2, in a process of sequentially performing the multiplexing process in each time unit overlapping in the time domain with the target uplink channel, further comprising:

upon determining that a preset condition is met, performing a dropping operation on at least one uplink channel in the Q set, wherein the preset condition comprises:

in the time unit of the current multiplexing process, the uplink channel obtained through the multiplexing process still spans a plurality of time units; or in the time unit of the current multiplexing process, the uplink channel obtained through the multiplexing process is located in a further time unit; or in the time unit of the current multiplexing process, a starting position of the uplink channel obtained through the multiplexing process is earlier than a starting position of the time unit of the current multiplexing process;

wherein performing the dropping operation on the at least one uplink channel in the Q set comprises:

upon determining that physical layer priorities of uplink channels in the Q set are different, dropping a low-priority uplink channel; or upon determining that physical layer priorities of uplink channels in the Q set are identical, dropping an uplink channel carrying a low-priority UCI type based on preset priorities of UCI types carried by the uplink channels;

wherein an order of the preset priorities of the UCI types is: hybrid automatic repeat request acknowledgement HARQ-ACK>scheduling request SR>channel state information CSI.

4. The method according to claim 1, wherein the method further comprises:

upon determining that there is no uplink channel overlapping in the time domain with the target uplink channel in the time unit of the current multiplexing process, continuing the multiplexing process in a next time unit overlapping in the time domain with the target uplink channel.

5. The method according to claim 1, wherein the at least two uplink channels are at least two uplink channels with different physical layer priorities;

determining the time unit of the multiplexing process comprises:

determining the time unit of the multiplexing process according to transmission time units of HARQ-ACKs with different physical layer priorities.

6. The method according to claim 5, wherein determining the time unit of the multiplexing process according to the transmission time units of the HARQ-ACKs with different physical layer priorities comprises:

determining a transmission time unit of a HARQ-ACK with a high priority among the different physical layer priorities as the time unit of the multiplexing process.

7. The method according to claim 1, wherein the at least two uplink channels are at least two uplink channels with different types;

determining the time unit of the multiplexing process comprises:

determining a transmission time unit of an uplink channel with a shorter transmission time unit among the at least two uplink channels as the time unit of the multiplexing process; or determining a transmission time unit of an uplink channel with a target type among the at least two uplink channels as the time unit of the multiplexing process.

8. The method according to claim 7, wherein the at least two uplink channels with different types comprise a multicast broadcast service (MBS) PUCCH and a unicast PUCCH.

9. The method according to claim 1, wherein the method further comprises:

in a case that a PUCCH in the processing result of the multiplexing process and a physical uplink shared channel PUSCH overlap in the time domain, upon determining that the terminal supports parallel transmission of the PUCCH and the PUSCH, transmitting the PUCCH and the PUSCH simultaneously;

upon determining that the terminal does not support the parallel transmission of the PUCCH and the PUSCH, performing multiplexing transmission on the PUCCH and the PUSCH, or dropping one of the uplink channels.

10. An uplink multiplexing transmission apparatus, comprising a memory, a transceiver and a processor;

wherein the memory is configured to store a computer program; the transceiver is configured to transmit and receive data under control of the processor; the processor is configured to read the computer program in the memory and perform the following operations:

determining a time unit of a multiplexing process in a case that at least two uplink channels with different physical layer priorities or different types overlap in a time domain;

for a target uplink channel spanning a plurality of time units in the at least two uplink channels, upon determining that a preset multiplexing end condition is not met, sequentially performing the multiplexing process in each time unit overlapping in the time domain with the target uplink channel until the preset multiplexing end condition is met, to obtain a final processing result of the multiplexing process;

performing uplink channel transmission based on the processing result of the multiplexing process;

wherein when sequentially performing the multiplexing process in each time unit overlapping in the time domain with the target uplink channel until the preset multiplexing end condition is met, the processor is configured to:

for a low-priority PUCCH spanning a plurality of time units, perform the multiplexing process in a first time unit overlapping in the time domain with the low-priority PUCCH;

upon determining in a current multiplexing process that the low-priority PUCCH is dropped or successfully multiplexed with a further uplink channel, stop a subsequent multiplexing process of the low-priority PUCCH in a further time unit overlapping in the time domain with the low-priority PUCCH;

otherwise, continue the multiplexing process of the low-priority PUCCH in a next time unit overlapping in the time domain with the low-priority PUCCH; repeat above process until the low-priority PUCCH is dropped or successfully multiplexed with a further uplink channel.

11. The apparatus according to claim 10, wherein when sequentially performing the multiplexing process in each time unit overlapping in the time domain with the target uplink channel, the processor is configured to:

determine all PUCCHs in a time unit of a current multiplexing process as a Q set, and execute the multiplexing process according to a multiplexing rule in a case of time domain overlapping, to obtain a PUCCH with no time domain overlap in the time unit of the current multiplexing process.

12. The apparatus according to claim 11, wherein in a process of sequentially performing the multiplexing process in each time unit overlapping in the time domain with the target uplink channel, the processor is further configured to:

upon determining that a preset condition is met, perform a dropping operation on at least one uplink channel in the Q set, wherein the preset condition comprises:

in the time unit of the current multiplexing process, the uplink channel obtained through the multiplexing process still spans a plurality of time units; or in the time unit of the current multiplexing process, the uplink channel obtained through the multiplexing process is located in a further time unit; or in the time unit of the current multiplexing process, a starting position of the uplink channel obtained through the multiplexing process is earlier than a starting position of the time unit of the current multiplexing process;

wherein when performing the dropping operation on the at least one uplink channel in the Q set, the processor is configured to:

upon determining that physical layer priorities of uplink channels in the Q set are different, drop a low-priority uplink channel; or upon determining that physical layer priorities of uplink channels in the Q set are identical, drop an uplink channel carrying a low-priority UCI type based on preset priorities of UCI types carried by the uplink channels;

wherein an order of the preset priorities of the UCI types is: hybrid automatic repeat request acknowledgement HARQ-ACK>scheduling request SR>channel state information CSI.

13. The apparatus according to claim 2, wherein the processor is further configured to:

upon determining that there is no uplink channel overlapping in the time domain with the target uplink channel in the time unit of the current multiplexing process, continue the multiplexing process in a next time unit overlapping in the time domain with the target uplink channel.

14. The apparatus according to claim 10, wherein the at least two uplink channels are at least two uplink channels with different physical layer priorities;

when determining the time unit of the multiplexing process, the processor is configured to:

determine the time unit of the multiplexing process according to transmission time units of HARQ-ACKs with different physical layer priorities.

15. The apparatus according to claim 14, wherein when determining the time unit of the multiplexing process according to the transmission time units of the HARQ-ACKs with different physical layer priorities, the processor is configured to:

determine a transmission time unit of a HARQ-ACK with a high priority among the different physical layer priorities as the time unit of the multiplexing process.

16. The apparatus according to claim 10, wherein the at least two uplink channels are at least two uplink channels with different types;

when determining the time unit of the multiplexing process, the processor is configured to:

determine a transmission time unit of an uplink channel with a shorter transmission time unit among the at least two uplink channels as the time unit of the multiplexing process; or determine a transmission time unit of an uplink channel with a target type among the at least two uplink channels as the time unit of the multiplexing process.

17. The apparatus according to claim 10, wherein the processor is further configured to:

in a case that a PUCCH in the processing result of the multiplexing process and a physical uplink shared channel PUSCH overlap in the time domain, upon determining that a terminal supports parallel transmission of the PUCCH and the PUSCH, transmit the PUCCH and the PUSCH simultaneously;

upon determining that the terminal does not support the parallel transmission of the PUCCH and the PUSCH, perform multiplexing transmission on the PUCCH and the PUSCH, or drop one of the uplink channels.

18. A non-transitory processor-readable storage medium, wherein the processor-readable storage medium stores a computer program, and the computer program is used to cause a processor to:

determine a time unit of a multiplexing process in a case that at least two uplink channels with different physical layer priorities or different types overlap in a time domain;

for a target uplink channel spanning a plurality of time units in the at least two uplink channels, upon determining that a preset multiplexing end condition is not met, sequentially perform the multiplexing process in each time unit overlapping in the time domain with the target uplink channel until the preset multiplexing end condition is met, to obtain a final processing result of the multiplexing process;

perform uplink channel transmission based on the processing result of the multiplexing process;

wherein when sequentially performing the multiplexing process in each time unit overlapping in the time domain with the target uplink channel until the preset multiplexing end condition is met, the computer program is used to cause the processor to:

for a low-priority PUCCH spanning a plurality of time units, perform the multiplexing process in a first time unit overlapping in the time domain with the low-priority PUCCH;

upon determining in a current multiplexing process that the low-priority PUCCH is dropped or successfully multiplexed with a further uplink channel, stop a subsequent multiplexing process of the low-priority PUCCH in a further time unit overlapping in the time domain with the low-priority PUCCH;

otherwise, continue the multiplexing process of the low-priority PUCCH in a next time unit overlapping in the time domain with the low-priority PUCCH; repeat above process until the low-priority PUCCH is dropped or successfully multiplexed with a further uplink channel.

* * * * *